(12) United States Patent
Marisetty et al.

(10) Patent No.: US 6,622,260 B1
(45) Date of Patent: *Sep. 16, 2003

(54) SYSTEM ABSTRACTION LAYER, PROCESSOR ABSTRACTION LAYER, AND OPERATING SYSTEM ERROR HANDLING

(76) Inventors: Suresh Marisetty, 1662 Lederer Cir., San Jose, CA (US) 95131; Mani Ayyar, 18816 Tuggle Ave., Cupertino, CA (US) 95014; Nhon T. Quach, 6522 Pfeiffer Ranch Rd., San Jose, CA (US) 95120; Bernard J. Lint, 445 Poppy Pl., Mountain View, CA (US) 94043

(*) Notice: Subject to any disclaimer, the term of this patent is extended or adjusted under 35 U.S.C. 154(b) by 0 days.

This patent is subject to a terminal disclaimer.

(21) Appl. No.: 09/475,417

(22) Filed: Dec. 30, 1999

(51) Int. Cl.[7] .................................................. G06F 11/00
(52) U.S. Cl. ........................................... 714/10; 714/37
(58) Field of Search ............................. 714/2, 3, 26, 37, 714/38, 10, 48, 57

(56) References Cited

U.S. PATENT DOCUMENTS

| | | | | |
|---|---|---|---|---|
| 4,317,010 A | * | 2/1982 | Fillot | 370/243 |
| 5,056,091 A | * | 10/1991 | Hunt | 714/10 |
| 5,107,500 A | * | 4/1992 | Wakamoto et al. | 706/916 |
| 5,245,615 A | * | 9/1993 | Treu | 714/3 |
| 5,313,625 A | * | 5/1994 | Hess et al. | 714/10 |
| 5,481,707 A | * | 1/1996 | Murphy et al. | 709/102 |
| 5,594,861 A | * | 1/1997 | Jonsson et al. | 379/242 |
| 5,619,644 A | * | 4/1997 | Crockett et al. | 714/45 |
| 5,673,386 A | | 9/1997 | Batra | 395/183.14 |
| 5,699,505 A | * | 12/1997 | Srinivasan | 714/31 |
| 5,717,850 A | * | 2/1998 | Apperley et al. | 714/48 |
| 5,740,357 A | | 4/1998 | Gardiner et al. | 395/185.1 |
| 5,784,547 A | * | 7/1998 | Dittmar et al. | 714/4 |
| 5,941,996 A | * | 8/1999 | Smith et al. | 714/47 |
| 5,948,107 A | * | 9/1999 | Ramanathan | 714/4 |
| 5,956,480 A | * | 9/1999 | Kurihara | 709/310 |
| 5,958,049 A | * | 9/1999 | Mealey et al. | 714/52 |
| 5,991,518 A | * | 11/1999 | Jardine et al. | 714/4 |
| 6,058,490 A | * | 5/2000 | Allen et al. | 709/321 |
| 6,061,810 A | * | 5/2000 | Potter | 714/23 |
| 6,065,139 A | * | 5/2000 | Mehta et al. | 714/2 |
| 6,170,067 B1 | * | 1/2001 | Liu et al. | 714/31 |
| 6,173,386 B1 | * | 1/2001 | Key et al. | 712/10 |
| 6,381,694 B1 | * | 4/2002 | Yen | 713/1 |
| 6,408,407 B1 | * | 6/2002 | Sadler | 714/2 |
| 6,438,709 B2 | * | 8/2002 | Poisner | 714/23 |

FOREIGN PATENT DOCUMENTS

| | | | | |
|---|---|---|---|---|
| EP | 0730230 | | 9/1996 | .......... G06F/11/14 |
| EP | 0953911 | | 11/1999 | .......... G06F/11/00 |

\* cited by examiner

*Primary Examiner*—Robert Beausoliel
*Assistant Examiner*—Gabriel L. Chu
(74) *Attorney, Agent, or Firm*—Schwegman, Lundberg, Woessner & Kluth, P.A.

(57) ABSTRACT

Systems and methods for error handling are disclosed. The systems and methods may be utilized for single or multiple processor computer systems to handle errors in a coordinated manner between hardware and any firmware or software layers. A computer system includes a non volatile memory and at least one processor. A firmware error handling routine is stored on the non volatile memory. The firmware error handling routine is for handling errors. Each of the at least one processors detects errors. Each processor executes the firmware error handling routine on detecting an error. The executed firmware error handling routine handles the error. The executed firmware error handling routine also logs error information to a log.

The systems and methods provide for coordinated error handling that enhance error recovery, provide error containment and maintain system availability.

52 Claims, 5 Drawing Sheets

SYSTEM ABSTRACTION LAYER, PROCESSOR ABSTRACTION LAYER, AND OPERATING SYSTEM ERROR HANDLING

FIELD OF THE INVENTION

This invention relates generally to processor systems, and more particularly to cooperative error handling in processor systems.

BACKGROUND OF THE INVENTION

An important element in creating a highly reliable computing system is the handling of errors such as hard errors and soft errors. Soft errors occur when alpha particles or cosmic rays strike an integrated circuit and alter the charges stored on the voltage nodes of the circuit. If the charge alteration is sufficiently large, a voltage representing one logic state may be changed to a voltage representing a different logical state. For example, a voltage representing a logic true state may be altered to a voltage representing a logic false state and any data that incorporates the logic state may be corrupted. This is also referred to as data corruption.

Soft error rates (SERs) for integrated circuits, such as microprocessors ("processors") increase as semiconductor process technologies scale to smaller dimensions and lower operating voltages. Smaller process dimensions allow greater device densities to be achieved on the processor die. This greater density increases the likelihood that an alpha particle or cosmic ray will strike one of the processor's voltage nodes. Lower operating voltages mean that smaller charge disruptions may alter the logic states represented by the node voltages. Both trends point to higher SERs in the future. Consequently, soft errors should be handled appropriately to avoid data corruption and other errors that may caused by soft errors.

Hard errors occur when components or devices in a computer system malfunction. Components or devices in a computer system can be damaged a number of ways such as by voltage fluctuations, power surges, lightning and heat. If these hard errors are not discovered and corrected, data corruption along with a complete system failure is likely.

The process of error handling consists of error detection and error recovery. Error detection is typically accomplished in the processor or system logic hardware through the addition of parity check bits in the memory arrays, buses and data paths.

Error recovery may include error containment and system availability. Error containment and system availability often conflict with each other. Error containment is preventing an error from propagating to other computer devices, components or system logic. System logic is the portion of the logic in a computer system that enables the processor, memory and input/output (IO) devices to work together.

Computer systems often reboot in an attempt to contain errors. While rebooting, the computer system is not available. Frequent rebooting of personal computers may be somewhat acceptable even though it is highly annoying. However, frequent rebooting of high availability systems, such as system servers, is not acceptable. System servers, such as mail servers and network servers, are generally relied on to run critical applications in a non-stop fashion.

Another consideration in error recovery is the error recovery time. The error recovery time is the time it takes for error recovery to be completed. While error recovery is being performed, operating systems lose control of the computer system. Many modern operating systems, such as Windows NT and Unix, cannot tolerate a loss of control of the system for a significant time while the system is going through error recovery.

Multiple processor (MP) computer systems further complicate the problems of error recovery and error recovery time. In MP computer systems, different processors are executing different processes. One or more of the processors may encounter the error but all of the processors can be affected. Generally, MP computer systems lack a coordinated approach to error recovery. This lack of an appropriate error handling can cause MP computer systems to reboot unnecessarily and data to be corrupted.

Additionally, error handling of today provides only limited error information without any specific format. In many cases, error handling of today provides no error information. Forcing a computer system to reboot is bad enough, but having your computer reboot without obtaining information about the error that caused your computer to reboot is even worse.

Not all errors encountered in a computer system can be recovered from. However, current error handling fails to provide enough error information.

For the reasons stated above, and for other reasons stated below which will become apparent to those skilled in the art upon reading and understanding the present specification, there is a need in the art for a computer system that handles errors in a coordinated manner.

SUMMARY OF THE INVENTION

The present invention provides systems and methods for error handling on processor systems. The systems and methods may be utilized for single or multiple processor computer systems to handle errors in a coordinated manner.

One embodiment of the invention is a computer system including a non volatile memory and at least one processor. A firmware error handling routine is stored on the non volatile memory. The firmware error handling routine is for handling errors. Each of the at least one processors detects errors. Each processor executes the firmware error handling routine on detecting an error. The executed firmware error handling routine handles the error. The executed firmware error handling routine also logs error information to a log. The firmware also coordinates the error handling with other software layers like the Operating System.

Other embodiments of systems and methods for error handling are disclosed.

DETAILED DESCRIPTION

Figure 1:
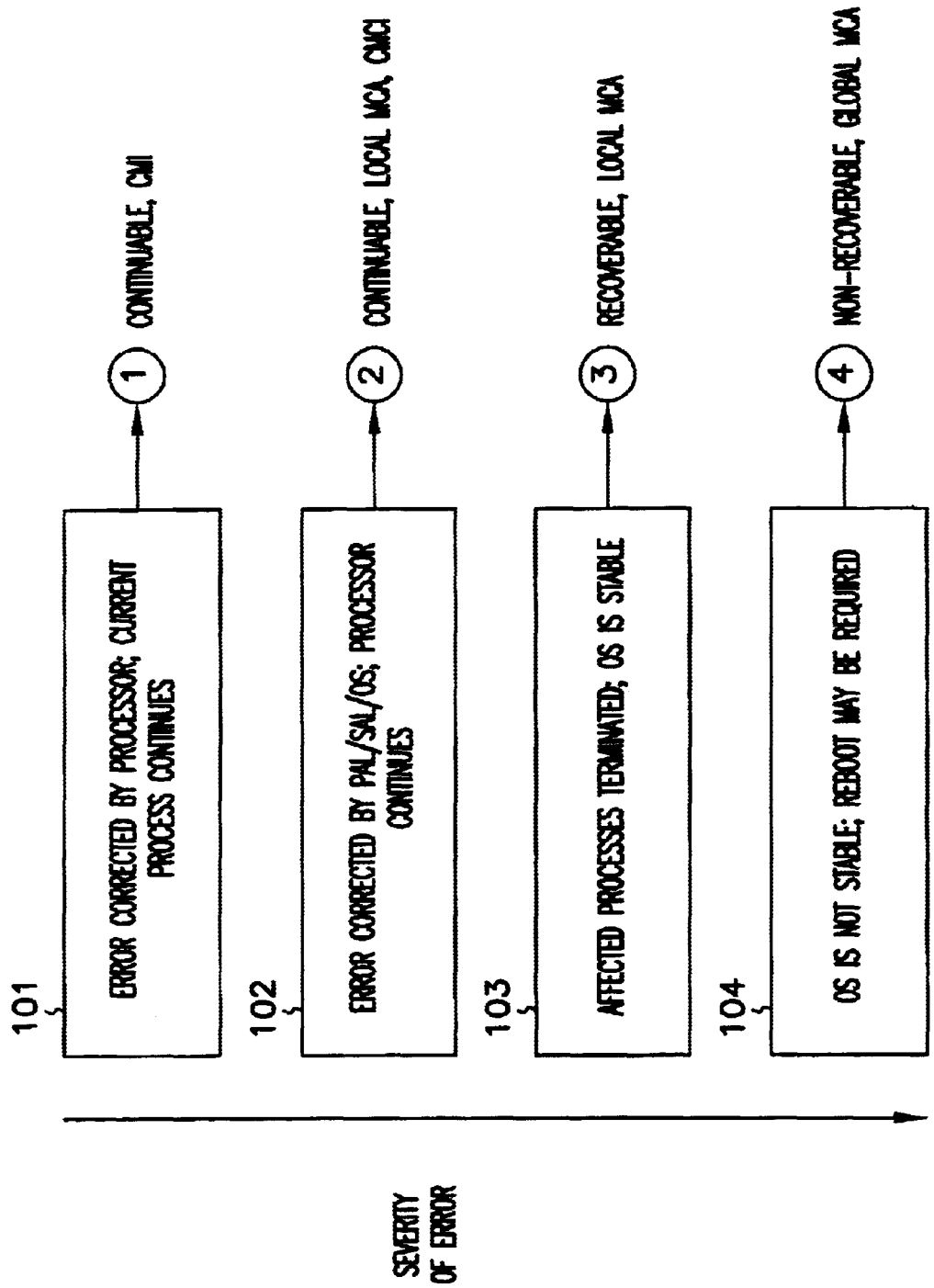
FIG. 1 illustrates errors that may occur in a computer system.

The following discussion sets forth numerous specific details to provide a thorough understanding of the invention. However, those of ordinary skill in the art, having benefit of this disclosure, will appreciate that the invention may be practiced without these specific details. In addition, various well known methods, procedures, components, and circuits have not been described in detail in order to focus attention on the features of the present invention.

As stated above, error handling in computer systems involve error detection and error recovery. In error recovery, errors should be contained and computer systems should be highly available. Computer systems utilizing error handling that is coordinated among processors, system logic hardware, firmware and operating system can contain errors and reduce the time computer systems are not available. Additionally, the processor(s), system logic hardware, firmware and operating system should have interfaces to one another to allow coordination between them during error handling.

System software is defined herein as the firmware and operating system (OS) that is executed by a single CPU in a single processor system, or is executed by a plurality of CPUs in a multi-processor system.

Firmware as used herein refers to processor routines that are stored in non-volatile memory structures such as read only memories (ROMs), flash memories, and the like. These memory structures preserve the code stored in them even when power is shut off. Even though firmware is stored in non-volatile memory, firmware may be copied or shadowed to volatile memory. Typically, this is done for performance reasons. One of the principal uses of traditional firmware is to provide necessary instructions or routines that control a computer system when it is powered up from a shut down state, before volatile memory structures have been tested and configured. Firmware routines may also be used to reinitialize or reconfigure the computer system following various hardware events and to handle certain platform events like system interrupts.

For one embodiment, firmware includes two major components, the processor abstraction layer (PAL) and the system abstraction layer (SAL). The PAL encapsulates all processor model specific hardware. The PAL provides a consistent software interface to access the processor resources across different processor implementations. SAL is a platform specific firmware component that is typically provided by original equipment manufacturers (OEM) and BIOS vendors. The SAL is a firmware layer that isolates an operating system and other higher level software from implementation differences in the platform. Both the PAL and SAL, provide system initialization and boot strapping, machine check abort (MCA) handling, platform management interrupt handling, and other processor and system functions which vary across different implementations.

Operating systems (OS) interact with firmware to provide an environment in which applications can be executed by the CPU. By utilizing firmware, an OS can be designed to run on many different processing systems without re-writing the OS for each variation in platforms.

A machine check abort (MCA) is a hardware event or signal that indicates that a hardware error or error has occurred that threatens to damage the architectural state of the machine and may possibly cause data corruption. A corrected machine check (CMC) is a signal or event that indicates that an error has been successfully corrected by hardware and/or software.

There are two types of MCAs, local and global. A local MCA is detected and handled by a single processor of a multiple processor (MP) computer system. The local MCA is invisible to other processors in the MP computer system. A global MCA may be detected by one or more processors, but is visible to all processors in the MP computer system.

For a single processor system, there are only local MCAs. The MCAs in the single processor computer system are not divided between global and local since there are not other processors in the computer system.

Additionally, there are two types of logs, MCA and CMC logs. MCA logs are for errors that have not yet been corrected and are used during error recovery to store information about the error and the ongoing error recovery process. CMC logs are for errors that have been corrected. CMC logs contain information about the error that occurred and may include information on how it was corrected. CMC logs may be converted from MCA logs when an error is corrected.

For one embodiment, errors that occur in a computer system can be divided into soft errors and hard errors. Generally, software errors involve faulty data and may be fixed by writing over the faulty data. Software errors may be triggered by alpha particles and cosmic rays and may be detected by parity checking or ECC. Hard errors are defects or malfunctions in any piece of hardware or component in the computer system, such as the platform hardware or processors.

FIG. 1 shows some of the types of errors that may occur in a computer system and the severity.

The first category of errors are errors that can be corrected by the processor that encountered the error 101 without using PAL, SAL, or OS. This error type is sometimes called as "continuable error with hardware correction". This is the least severe error of FIG. 1. The processor can correct this error and continue executing its current process without any impact on its current course. In a multi processor environment, these types of errors do not require shutting down any of the processors. An example of this type of error is a single bit ECC (error correcting code) error in a processor cache that is corrected by platform chipset hardware. Generally, a CMC signal or event is sent to the firmware and operating system to inform the firmware and operating system that an error has occurred and has been corrected.

The second category of errors are errors correctable using error handling routines in PAL 101, SAL 102, and OS 103 and is shown at 102. This error type is sometimes called "continuable error with firmware correction". Typically, any processes executing on a detecting processor are interrupted and information necessary to resume the these processes is stored in a log. The error handling routines in these layers can be used to correct the error and the processes can resume execution. The resumed processes are unaware of the error or the interruption. An example of this type of error is a parity error in the processor instruction cache. In this case, firmware will invalidate the entire instruction cache, access another copy of the instruction, and resume execution of the interrupted process. This type of error can be signaled to a processor by the platform via a double bit ECC error on the system bus.

The third category of errors are errors that cannot be completely corrected by either the processors or firmware (PAL and SAL) and the offending process needs to be terminated to achieve error containment and is shown at 103. This error type is sometimes called a "recoverable error". These errors are corrected by the error handling routine of an OS. An example of this type of error is a parity error in a first level data cache. When this error is detected, the processor cannot prevent the register file from being updated with the bad data. In this case, the firmware will flush the entire first level data cache and the offending process is terminated by the error handling routine of the OS if it is a non-critical user or kernel process. If the process is critical, a reboot or halt of the system is typically performed.

The fourth category of errors are errors that can not be corrected by the processors, platform hardware, PAL, SAL, and OS and is shown at 104. This type of error is referred to as a "non-recoverable error". For these errors, the system may need a reboot or halt and execution can not continue. An example of this type of error is a parity error on any access to a dirty line in a processor cache. In a multi-processor environment, a global MCA signal is generated and sent to processors other than the detecting processor.

Figure 2:
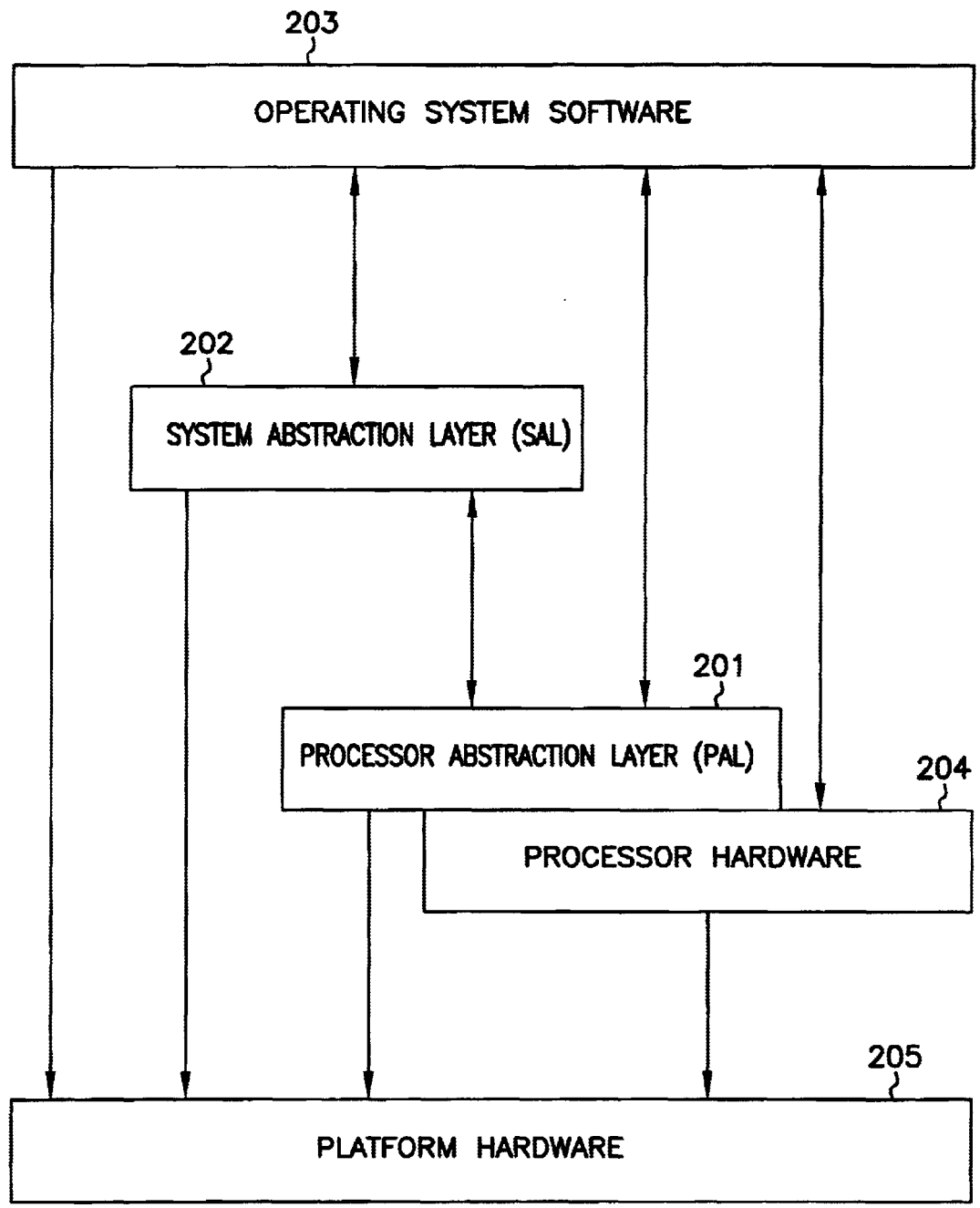
FIG. 2 illustrates a system for error handling according to one embodiment of the present invention.

FIG. 2 illustrates one embodiment of a system for coordinated error handling. The system includes a PAL 201, SAL 202, OS 203, at least one processor 204, and platform hardware 205. The system is not limited to operating only at boot time and operates during run time. The PAL 201 and SAL 202 are together known as firmware. The code for these layers may reside in a non-volatile memory or persistent memory of the system such as flash read only memory (ROM). The code for these layers may be shadowed to other memory devices. In the following discussion, it is intended that the terms PAL, SAL, and OS represent PAL, SAL, or OS code intended to be executed by a processor.

PAL 201 includes a set of procedures and an error handling routine. The set of procedures access processor hardware, and can encapsulate processor model specific hardware. This set of procedures may be called by other system software or hardware. By providing the set of procedures, PAL 201 provides a consistent interface to access processor resources across different processor implementations. The error handling routine of PAL 201 is also known as PAL_CHECK. Error handling for an error may be handed off to the error handling routine of PAL 201 or PAL_CHECK.

SAL 202 includes an error handling routine. The error handling routine is also known as SAL_CHECK. The error handling routine may be handed off to from the error handling routine of PAL 201 or from PAL_CHECK to SAL_CHECK.

OS 203 also includes an error handling routine. The error handling routine may be handed off to from the error handling routine of SAL 202. The error handling routine of OS 203 is a machine check component of OS 203 also known as OS_MCA.

Processor 204 can represent one or more processors in a single or multiple processor (MP) computer system and is not limited to a certain processor. The platform hardware 205 includes hardware typically used in computer systems including, but not limited to, off chip caches, buses, buffers, memory, system logic and peripheral devices.

On processor 204 detecting an error, a machine check abort (MCA) is generated. A machine check abort (MCA) is a hardware event or signal that indicates that a hardware error or error has occurred that threatens to damage the architectural state of the machine and may possibly cause data corruption.

The detecting processor attempts to correct the error. If the detecting processor is able to correct the error, a correctable machine check interrupt (CMCI) or other CMC signal is generated. If the detecting processor is unable to correct the error, the detecting processor executes the error handling routine of PAL 201 thereby handing off to the error handling routine of PAL 201.

The error handling routine of PAL 201 determines if errors are processor related, saves minimal state information and corrects errors where possible. The minimal state information may be saved to a log or log register and contains sufficient information for another layer such as SAL 202 to understand the error at a global level and to potentially resume interrupted processes. Additionally, the PAL 201 error handling routine attempts to contain the error and correct the error. Error containment simply means keeping the error within boundaries and preventing the error from propagating to other processors or networks. One example of containing and correcting an error is that a corrupted instruction cache line can be removed and the cache line marked unusable. If the error handling routine succeeds at recovering from the error, a CMCI may be generated. Once the error handling routine of PAL 201 has completed handling the error, execution branches to or is handed off to the error handling routine of SAL 202. When execution is handed off to the error handling routine of SAL 202, minimal state information and error status is passed to the error handling routine of SAL 202.

The error handling routine of SAL 202 determines whether it has enough information to process or handle the error. If the error handling routine determines that more information is needed, the error handling routine of SAL 202 may call the set of PAL 201 procedures to obtain additional state information about the processor and the error. Additionally, the error handling routine logs information about the error to a log. The error handling routine attempts to correct the error. If the error remains uncorrected, the error handling routine of SAL 202 analyzes the state information and the type of error received from PAL 201 and determines the severity of the error as being either continuable, recoverable, or non-recoverable. Additionally, the error handling routine may compare the errors to other errors that have occurred and have not yet corrected. In the event that multiple errors have occurred, the error handling routine of SAL 202 prioritizes which errors are to be handled first corresponding to the severity of the error.

For errors which have the characteristic of being severe and global or when several errors occur within a short amount of time, the error handling routine of SAL 202 causes the computer system to enter a rendezvous state to handle the error. In the rendezvous state, all processors in the computer system except for one enter an idle state. The one processor, also known as a monarch processor, takes over error handling. The monarch processor performs error handling at the system level and accumulates all the error logs. The monarch processor may access procedures and routines from PAL 201, SAL 202 and OS 203.

The log that the error handling routine of SAL 202 generates is in a predetermined format and may be accessed by the OS 203 or other diagnostic software. The error handling routine of SAL 202 logs processor and platform error information, saves processor and platform state information, performs hardware specific corrections, clears the error log and re-enables future information collection, halts the processor or platform as necessary, and handles multi processor situations. The processor and platform error information is logged in either a CMC log or MCA log. The error handling routine of SAL 202 can use the PAL 201 set of procedures to obtain additional information from the processor or platform. CMC logs store information about errors corrected by hardware or firmware. For corrected errors, intervention by the OS 203 is not required for error handling, only PAL and SAL will do most of the work and return back to the interrupted processes, but OS 203 can be notified of the corrected error through a low priority corrected machine check (CMC) signal or event. The system software can generate the CMC event by polling for a flag or by programming the hardware to generate an interrupt.

For errors which are not corrected by the error handling routine of SAL 202, execution branches or hands off from the error handling routine of SAL 202 to the error handling routine of OS 203.

The error handling routine of OS 203 retrieves the logs and state information from SAL 202. The error handling routine performs correction on operating system controlled hardware resources. Further, the error handling routine checks the state information to see if processing can continue if the error is corrected. For example, if PAL 201 did not get all the state information, the system may be unable to continue processing even if the error is corrected. If the error handling routine of OS 203 corrects the error, processor execution branches to the error handling routine of SAL 202 with the status of the corrected error. Also, the error handling routine of OS 203 can call the set of PAL procedures to return to an interrupted process, jump to the interrupted context or set a new context. If the error remains uncorrected, control of execution returns to the error handling routine of SAL 202 with an uncorrected status value and an indication for the error handling routine of SAL 202 to halt or reboot the system.

Figure 3:
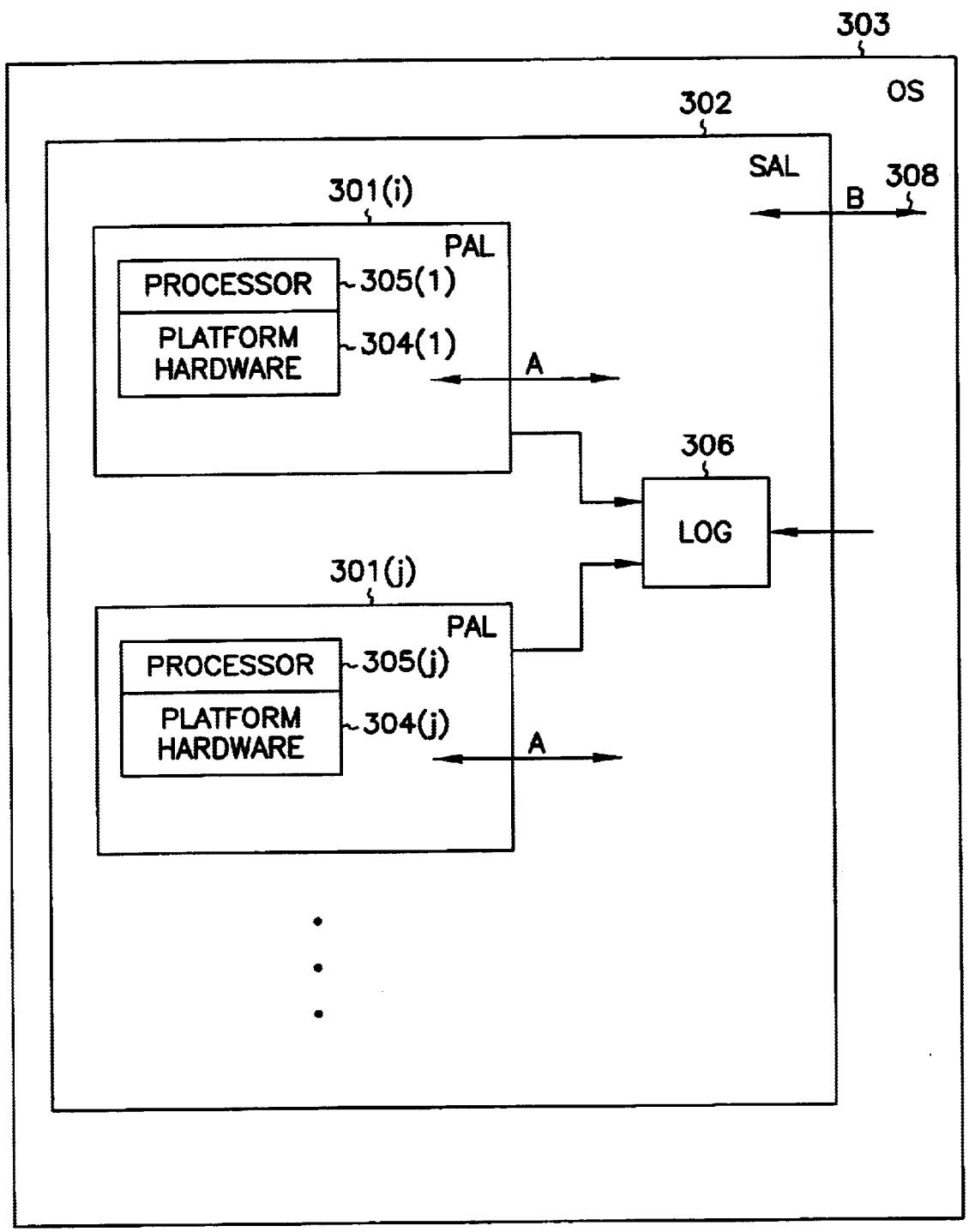
FIG. 3 illustrates a system for error handling according to one embodiment of the present invention.

FIG. 3 illustrates one embodiment of a system for error handling. The system includes at least one processor 304(1)–304(j) (collectively 304), at least one platform hardware 305(1)–305(j) (collectively 305), a processor abstraction layer (PAL) 301(1)–301(j) (collectively 301), a system abstraction layer (SAL) 302 and an operating system (OS) 303.

The processor 304 and platform hardware 305 can detect errors and attempt to correct them. Errors that affect only one processor are local errors. Errors that effect more than one error are global errors. If the processor 304 is unable to correct the error, error handling is handed off to PAL 301. On detecting an interrupt, a signal or interrupt is generated to allow other system software to be aware of the error.

Each PAL 301 is coupled to a corresponding processor and platform hardware. PAL 301 provides a consistent software interface to access the processor resources across different processor implementations. The software interface may be utilized by other software in the system including the OS 303 and hardware such as the one or more processors 304 and the at least one platform hardware 305. For software layers above PAL 301, the software interface is in the form of an API. API calls always return back to the caller.

PAL 301 includes an error handling routine that, when executed by a processor, performs error handling. Control of error handling is handed off to the PAL error handling routine if the processor 304 was unable to correct a detected error. The PAL error handling routine attempts to correct the error or recover from the error. When the PAL error handling routine has finished its processing of the error, control of error handling hands off to SAL 302. Additionally, the PAL error handling routine passes error information to SAL 302. The error information can include information such as error type, error status (corrected or uncorrected) and information related to the error. The "hand off" is a unidirection transfer of control.

SAL 302 is a platform specific firmware component that is typically provided by original equipment manufacturers (OEM) and BIOS vendors. The SAL is a firmware layer that isolates an operating system and other higher level software from implementation differences in the platform. There is a PAL-SAL software interface that allows communication between these PAL and SAL layers. The PAL-SAL interface is of a predetermined and standardized format. SAL 302 includes an error handling routine that, when executed by a processor, performs error handling. The SAL error handling routine is branched to once the PAL error handling routine has finished processing the error or attempting to correct the error. The SAL error handling routine checks the status of the error. If the error is uncorrected, the SAL error handling routine determines the severity of the error, creates a log regarding the error or adds information regarding the error to a log and attempts to correct the error. The severity of the error is determined by using the PAL error information. The SAL error handling routine may use PAL procedures or PAL APIs to gain additional information about the error in order to determine the severity of the error. If the error is corrected, the SAL error handling routine creates a log regarding the error or adds information regarding the error to an existing log.

SAL 302 generates a system log 306 for storing information about errors. The system log may include a processor log and a platform log. The processor log contains log information pertaining to the processor. In a multiprocessor environment, the processor log contains information pertaining to the processor on which a call for state information is executed. The platform log contains information pertaining to the entire platform. Since multiple errors are possible, the error log information is structured in the form of a linked list of error log structures with each entry describing one error.

The information contained in the log is implementation dependent. However, the log will generally include a time stamp, validation bits, cache status, TLB check info, and system bus information, and platform specific information for memory and I/O errors.

SAL 303 includes a GET_INFO procedure or API for getting state information. The procedure provides a programmatic interface to processor and platform information logged by SAL 302 with respect to the machine state at the time of errors including MCAs and CMCs. The procedure may be called by the OS 303 or any other diagnostic software. The procedure provides a standardized format for accessing logged information. The amount of state information saved by SAL is implementation dependent. SAL 302 can provide an indication of what information SAL is logging. This may be done, for example, by providing validation bits indicating the saved state information. The procedure may clear the log if instructed to do so by the calling OS 303 or other diagnostic software. The log may be stored in a register. The log is generally cleared on booting the system. In the case of multiple errors of the same type, the log will provide details and information relating to the first occurring error. The call may specify whether it is requesting a platform log or processor log. The procedure can write the log information to a region of memory specified by the calling software.

The system log 306 may be used by other software layers and applications. These layers and applications may inform a user of errors that have occurred, data that has been damaged, or parts that need to be replaced.

Once the SAL 302 error handling routine has finished processing the error, error handling branches or is handed off to the OS 303 if the SAL error handling routine was not able to correct the error.

On some types of errors, the SAL or PAL error handling routine forces the computer system to enter a rendezvous state in order to attempt error recovery. In the rendezvous state, only one of the at least one processors and its corresponding PAL and platform hardware are operational. The one processor is called a monarch processor. The other processors are in an idle state. The monarch processor performs the error handling. The rendezvous state is often used for global errors.

The OS 303 interacts with the PAL 301 and SAL 302 to provide an environment in which applications may be run. The OS 303 interacts with PAL 301 and SAL 302 by using as OS-PAL and OS-SAL software interfaces. The OS-PAL and OS-SAL have a predetermined format. The OS-PAL interface is an interface between the OS 303 and PAL 301. The OS-SAL interface is an interface between the OS 303 and SAL 302. The OS 303, like SAL 302, is system wide. The OS 303 includes an error handling routine that, when executed by a processor, performs error handling including error recovery. The OS 303 error handling routine is passed some information from the SAL error handling routine. The OS 303 may utilize PAL 301 procedures to obtain additional information about the error. Further, the OS error handling routine may access the system log 306 created by SAL 302 by utilizing the SAL 302 API. The OS 303 may cause processes to be interrupted. The OS 303 may tell the user to replace a certain system component that caused the error. If the OS 303 is unable to correct the error, the OS may require that the system be halted or rebooted.

Figure 4:
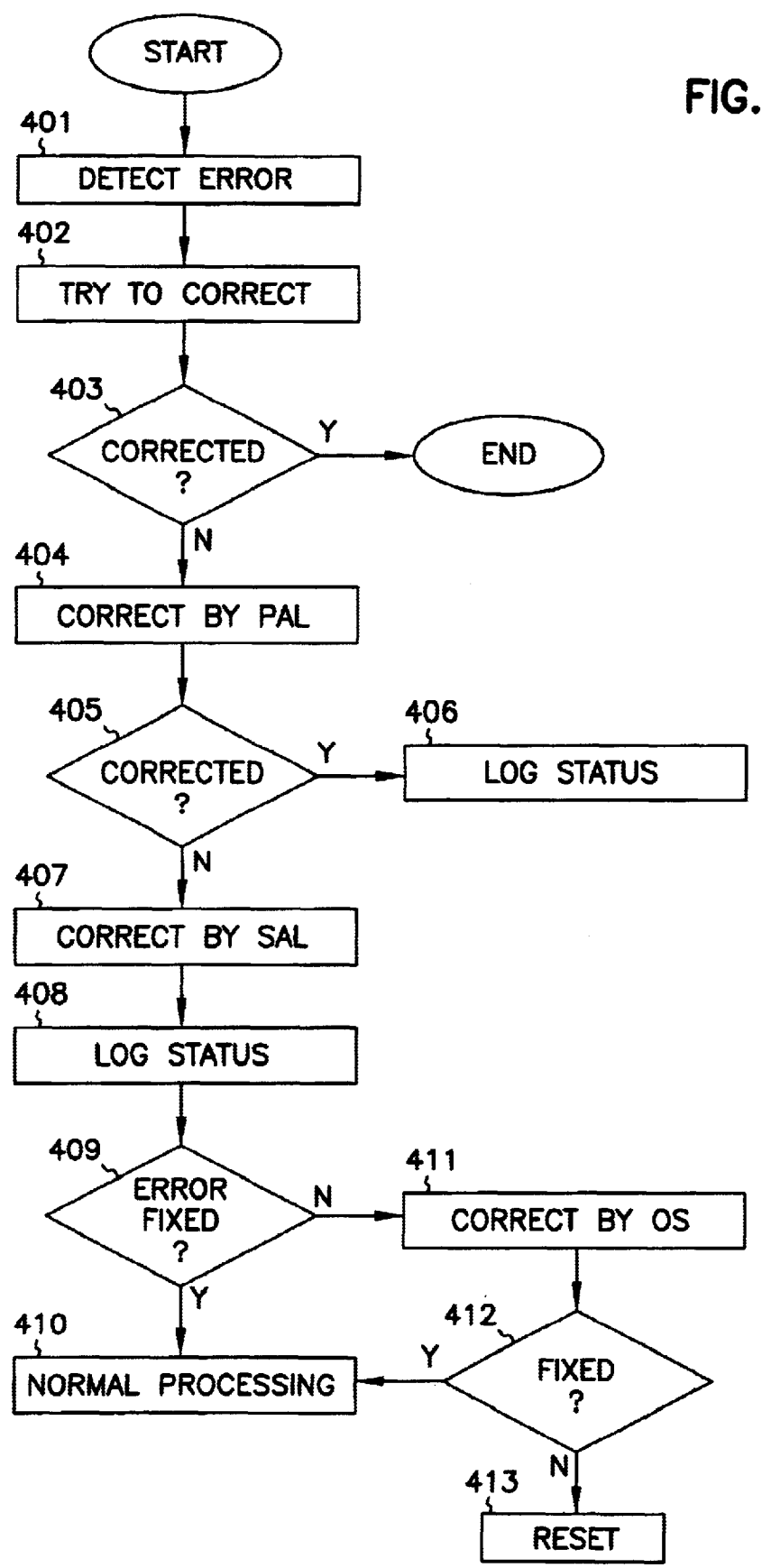
FIG. 4 illustrates a method for handling errors according to one embodiment of the present invention.

FIG. 4 shows a flow chart of one embodiment for cooperative error handling in a computer system. The system hardware detects an error at 401 and generates a hardware event or signal known as a machine check. The system hardware can include but is not limited to at least one processor, a chipset, buffers, off-chip caches, buses, peripheral devices and other devices.

The system hardware attempts to correct the error at 402. The system hardware may have some built in mechanism to correct certain errors or the system hardware may access routines in firmware to correct the error. If the error is corrected 403, processing of the system continues without having interrupted any processes. A signal or interrupt may be sent to an operating system and firmware to notify the firmware and operating system that an error has occurred and been corrected. An example of a type of error that is correctable by the system hardware is a single bit error in a processor cache that is corrected by processor hardware.

If the system hardware is unable to correct the error, control of error handling passes to a PAL error handling routine at 404. The PAL error handling routine is executed on a processor, usually the detecting processor, of the system hardware. The error handling routine attempts to correct the error at 404. The PAL error handling routine may also create a log containing state information and error status.

If PAL corrects the error, SAL generates or creates a log of the error. SAL saves or logs information about the error and how it was corrected to the log. If PAL fails to correct the error, SAL attempts to correct the error at 407. SAL may access PAL procedures to attempt to correct the error. Additionally, SAL determines the severity of the error by analyzing the error and the state information. SAL may determine that the error is so severe that it can not be corrected and recoverable. For these uncorrectable or unrecoverable errors SAL causes the computer system to halt or reboot. Additionally, SAL generates or creates a log of the error regardless of whether the error has been corrected 408. SAL may log information such as the error type and error status. Additionally, SAL logs state information.

If the firmware was not able to correct the error 409, the OS attempts to correct the error 411. The OS determines if any processes need to be interrupted. The OS also determines whether normal execution can continue even if the error si corrected. In some instances, it may be necessary to reboot even if the OS is able to correct the error. In other instances, the OS can only report the error and cause the system to halt. If the error is corrected 412, normal processing is resumed and error handling ends at 410. If the error is not corrected 412, the computer system is rebooted or halted at 413.

An example of the error that may be corrected by the OS is a parity error in a data cache resulting in faulty data. The OS may terminate the process that created or used the data in the data cache. An example of an error that may not be corrected by the OS is a parity error in a portion of system memory where critical portions of the operating system are located. Those portions can not be expected to perform reliably and the system should be halted or rebooted to prevent further errors.

Figure 5:
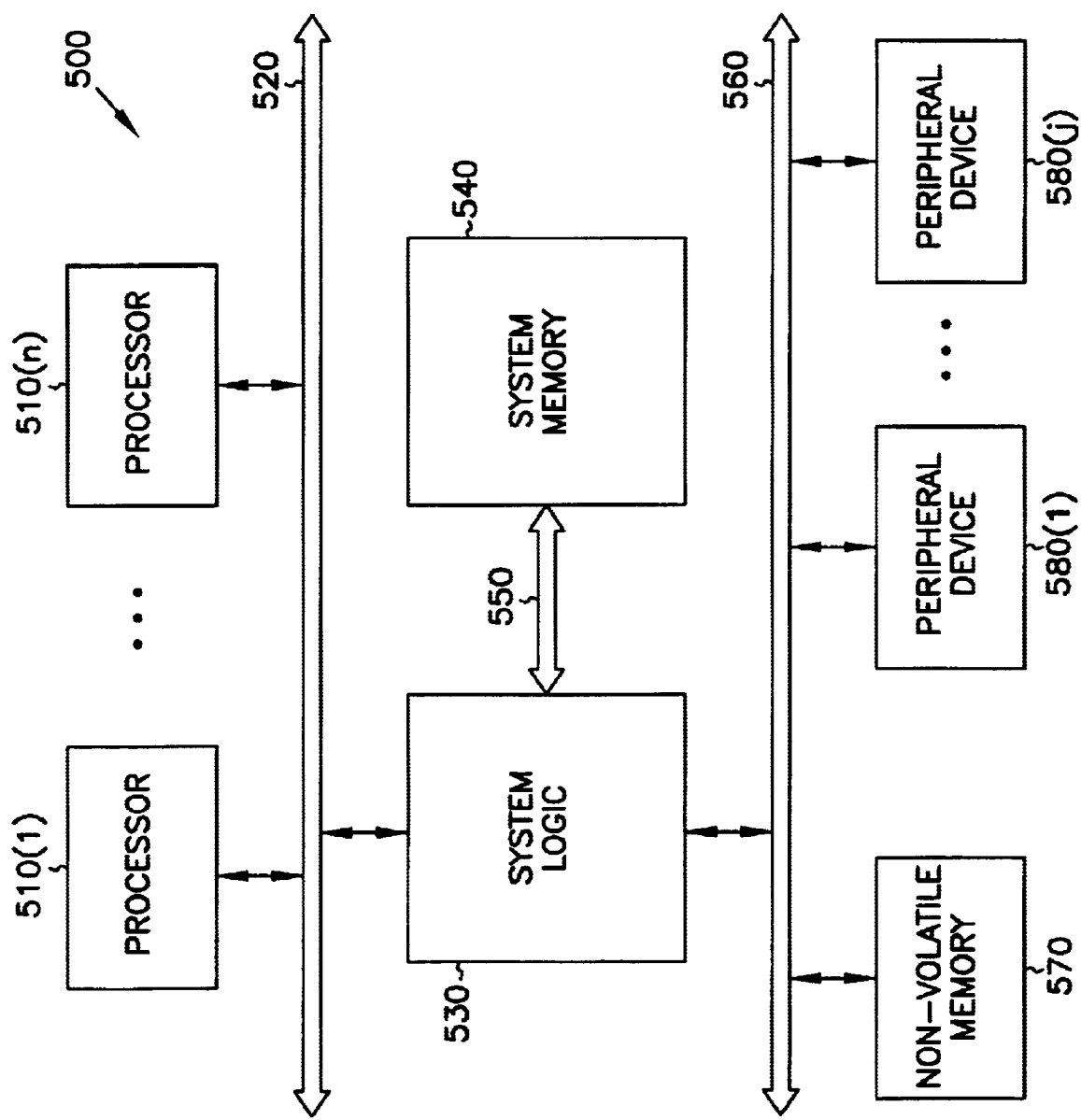
FIG. 5 illustrates a computer system suitable for implementing the present invention.

FIG. 5 is a block diagram of one embodiment of a computer system 500 that is suitable for implementing the present invention. The disclosed embodiment of computer system 500 includes one or more processors 510 that are coupled to system logic 530 through a processor bus 520. A system memory 540 is coupled to system logic 520 through bus 550. A non-volatile memory 570 and one or more peripheral devices 580(1)–580(j) (collectively, devices 580) are coupled to system logic 530 through peripheral bus 560. Peripheral bus 560 represents, for example, one or more peripheral component interconnect (PCI) buses, industry standard architecture (ISA) buses, extended ISA (EISA) buses, and comparable peripheral buses. Non-volatile memory 570 may be a static memory device such as a read only memory (ROM) or flash memory. Peripheral devices 580 include, for example, a keyboard, mouse or other pointing devices, mass storage devices such as hard drives and digital video discs (DVD), a display, and the like. These devices, together with system logic 530 define the computing platform for system 500.

For the disclosed embodiment of system 500, the at least one processor 510 may execute code or routines stored in system memory 540. The code for the operating system (OS) is in the system memory 540. The processor also executes code from the non-volatile memory 570. The firmware including PAL and SAL can be located in the non-volatile memory.

The various embodiments described above and other variations permit better error handling in computer systems cooperatively handling errors. These embodiments can extend to networked systems or distributed systems. By handling errors better, other software can be developed with less regard for possible errors. Errors propagated from other errors can be reduced in number because errors can be handled before encountered by other processors. Software developers can focus more on features and new developments for their products with the resources saved by better error handling in the system. Computer users can notice improved performances in systems, less system shutdowns and reboots, less data loss from unexpected shutdowns and time saved by having a computer system that is more stable.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefor, it is manifestly intended that this invention be limited only by the following claims and equivalents thereof.

What is claimed is:

1. A method executing in a computer system comprising:
   detecting an error by a detecting processor;
   executing error handling code of a first layer of software, by the detecting processor, to perform the following:
      saving state information;
      attempting to correct the error;
      after failure to correct the error, executing error handling code of a second layer of software by the detecting processor to perform the following:
         determining severity of error by analyzing state information and the error received from the first layer;
         saving additional state information; and
         halting the computer system if necessary; and
      after failure to correct the error by the second layer of software, executing error handling code of an operating system by the detecting processor to perform the following:
         checking state information and the error to determine whether processing can continue;
         halting the computer system if processing unless processing can continue; and
         attempting to correct the error.

2. A method comprising:
   detecting an error;
   sending a signal to a processor abstraction layer, a system abstraction layer, and an operating system of the error;
   interrupting processing if necessary;
   attempting to correct the error by the processor abstraction layer and informing the system abstraction layer of success or failure in correcting the error;
   after success by the processor abstraction layer, informing the operating system of the correction;
   after failure by the processor abstraction layer, attempting to correct the error by the system abstraction layer and informing the operating system of success or failure;
   after failure by the system abstraction layer, attempting to correct the error by the operating system; and
   after failure by the operating system, initiating a system reboot.

3. The method of claim 2, further comprising determining a severity of the error and halting system on certain errors.

4. A method, where:
   a processor detects an error;
   a processor abstraction layer (PAL) error handler creates an entry in an error log, saves state information, and attempts to correct the error within the processor hardware;
   if the PAL error handler fails to correct the error, a system abstraction layer (SAL) error handler accesses the error log, determines a severity of the error, and attempts to correct the error within the system hardware;
   if the SAL error handler fails to correct the error, an operating system (OS) error handler accesses the error log, and in response to the severity either attempts to correct the error within the system software or terminates a software process.

5. The method of claim 4 where the PAL error handler includes a set of error handling routines executed by the PAL error handler.

6. The method of claim 5 where the SAL error handler also executes at least some of the error handling routines.

7. The method of claim 4 where the SAL error handler responds to the saved state information.

8. The method of claim 7 where the SAL error handler saves additional state information.

9. The method of claim 4 where the PAL and the platform-level handlers report the error to an operating system.

10. The method of claim 4 where the operating system reports the error to a user.

11. The method of claim 4 where the error log contains further entries for other uncorrected errors.

12. The method of claim 11 where the error handlers prioritize the uncorrected errors.

13. The method of claim 11 where at least one of the uncorrected errors is a past uncorrected error.

14. The method of claim 13 where at least one of the error handlers compares the error to the past uncorrected error.

15. The method of claim 4 where the OS error handler terminates a process.

16. The method of claim 15 where the OS error handler resumes the process after the error has been corrected.

17. The method of claim 4 where the OS error handler halts the system.

18. A computer-readable storage medium containing instructions to execute on a computer the method where:
   a processor detects an error;
   a processor abstraction layer (PAL) error handler creates an entry in an error log, saves state information, and attempts to correct the error within the processor hardware;
   if the PAL error handler fails to correct the error, a system abstraction layer (SAL) error handler accesses the error log, determines a severity of the error, and attempts to correct the error within the system hardware;
   if the SAL error handler fails to correct the error, an operating-system (OS) error handler accesses the error log, and in response to the severity either attempts to correct the error within the system software or terminates a software process.

19. A data processing system, comprising:
   a processor to execute software processes and to detect an error in the system, and including a processor abstraction layer (PAL) to present a consistent interface from any of a number of different processor models;
   an error log having at least one entry to record the error;
   a PAL error handler to save state information, to create the error-log entry, and to diagnose and/or correct errors within the PAL, the PAL error handler including a set of PAL error-handling routines responsive to the state information and to the error-log entry;
   system hardware including a system abstraction layer (SAL) to present a consistent interface from any of a number of different system hardware models;
   a SAL error handler, responsive to failure of the PAL error handler, to the saved state information, and to the error-log entry to diagnose and/or correct errors within the SAL and to produce a severity indication;
   an operating system (OS) error handler, responsive to failure of the SAL error handler, to diagnose and/or correct errors within one of the software processes executing on the system, and responsive to the severity indication to terminate a software process;
   an error log having at least one entry in a standard format accessed by the PAL, SAL, and OS error handlers to employ in diagnosing and/or correcting the error.

20. The system of claim 19 further comprising a non-volatile memory to store both the PAL and SAL error handlers as firmware.

21. The system of claim 20 where the non-volatile memory further stores the PAL error-handling routines.

22. The system of claim 20 further including a volatile memory to store the OS error handler.

23. The system of claim 19 where the error log contains entries for multiple errors.

24. The system of claim 23 where at least one of the error handlers is adapted to diagnose and/or correct multiple concurrent errors.

25. The system of claim 23 where the error log is an expandable linked list.

26. The system of claim 19 where the OS responds to the error log to report the error to a system user.

27. The system of claim 19 where both the PAL and the SAL error handlers execute at least some of the PAL error-handling routines.

28. The system of claim 19 where the SAL error handler determines a severity level of the error.

29. The system of claim 28 where the OS error handler responds to the severity level either to diagnose and/or correct the error, or to terminate a software process executing on the system.

30. The system of claim 29 where terminating a software process includes halting the system.

31. The system of claim 29 where terminating a software process includes rebooting the system.

32. The system of claim 19 further comprising additional processors to execute the software processes and to detect the error.

33. The system of claim 19 further comprising system logic coupled at least to the processor.

34. The system of claim 33 further comprising a non-volatile memory coupled to the system logic and storing the PAL and SAL error handlers.

35. The system of claim 19 further comprising a system memory to store the software processes.

36. The system of claim 35 where the system memory further stores the OS error handler.

37. The system of claim 19 further comprising at least one peripheral device.

38. The system of claim 37 where the at least one peripheral device reports the error to a user.

39. A method, where:
    any one of multiple processors detects an error;
    a PAL error handler executes within the one processor that detected the error to
        create an entry in an error log,
        save state information,
        attempt to diagnose and/or correct the error;
    if the one PAL error handler fails to correct the error, a system abstraction layer (SAL) error handler attempts to correct the error in response to the error log entry and the saved state information,
    if the SAL error handler fails to correct the error, an operating system (OS) error handler attempts to correct the error in response to the error log entry and the saved state information;
    the OS error handler terminates a software process if the error is severe.

40. A method, comprising:
    executing error handlers in various ones of multiple processors to detect errors;
    detecting an error in the system by one of the error handlers executing in one of the processors;
    determining in the one error handler whether the error has a certain characteristic;
    if the error has the characteristic, placing the system in a rendezvous state;
    after the system enters the rendezvous state, performing error handling in a designated one of the processors and idling others of the processors.

41. The method of claim 40 where performing error handling in the one processor comprises executing one of the error handlers in the one processor.

42. The method of claim 41 where the error handlers maintain an error log.

43. The method of claim 42 where the designated one processor accumulates the error log entries of the other processors.

44. The method of claim 40 where the error handlers comprise:
    a PAL error handler;
    a SAL error handler.

45. The method of claim 44 where performing error handling in the one processor comprises executing the SAL error handler in the one processor.

46. The method of claim 44 where the PAL error handler includes multiple routines.

47. The method of claim 46 where both the PAL and the SAL error handlers access the multiple routines.

48. The method of claim 46 where the error handlers further comprise an operating-system (OS) error handler.

49. The method of claim 48 where the SAL error handler hands off to the OS error-handler if the SAL error handler fails to correct the error.

50. The method of claim 40 further comprising determining whether the error is global.

51. The method of claim 50 further comprising determining whether the error is severe, and where the certain characteristic is that the error is global and severe.

52. The method of claim 40 further comprising detecting multiple errors, and where the certain characteristic is that a certain number of errors occur within a fixed amount of time.

* * * * *